(12) United States Patent
Cherry

(10) Patent No.: US 7,196,634 B2
(45) Date of Patent: Mar. 27, 2007

(54) SYSTEMS FOR PREDICTING EARTHQUAKES AND METHODS OF EMPLOYING SUCH SYSTEMS

(75) Inventor: J. Theodore Cherry, Licking, MO (US)

(73) Assignee: Science Horizons, Inc., Licking, MO (US)

( * ) Notice: Subject to any disclaimer, the term of this patent is extended or adjusted under 35 U.S.C. 154(b) by 690 days.

(21) Appl. No.: 10/748,688

(22) Filed: Dec. 31, 2003

(65) Prior Publication Data

US 2004/0260475 A1 Dec. 23, 2004

Related U.S. Application Data

(63) Continuation-in-part of application No. 10/119,196, filed on Apr. 10, 2002, now Pat. No. 6,870,482.

(51) Int. Cl.
*G08B 21/00* (2006.01)

(52) U.S. Cl. .................. 340/690; 367/14; 367/16; 367/27; 367/33; 702/14; 702/15; 702/18

(58) Field of Classification Search .............. 340/690, 340/601; 367/6, 9, 16, 21, 28, 33, 153, 14, 367/27; 702/14, 15, 18
See application file for complete search history.

(56) References Cited

U.S. PATENT DOCUMENTS 4,057,780 A * 11/1977 Shuck .......................... 367/86
4,280,200 A * 7/1981 Silverman ..................... 367/37

(Continued)

FOREIGN PATENT DOCUMENTS

EP      WO 0058756      10/2000

OTHER PUBLICATIONS

Seismic Array Observation Network System, S. Matsuoka et al., vol. 34, No. 7, 1983, pp. 1147-1156.

(Continued)

*Primary Examiner*—Toan N. Pham
(74) *Attorney, Agent, or Firm*—Baker Botts, LLP

(57) ABSTRACT

A method of predicting earthquakes includes the step of positioning a first transducer array adjacent to a seismically active region and below the water table, i.e., within the zone of saturation. The first transducer array includes a first plurality of seismometers, at least one first clock, and at least one first digitizer. The at least one first clock is in communication with at least one of the first plurality of seismometers, and the at least one first digitizer also is in communication with at least one of the first plurality of seismometers. The method also includes the steps of detecting a plurality of wave movements resulting from dilation of the crust of the Earth prior to an earthquake, and converting at least one of the wave movements into a first voltage. The method further includes the step of discriminating between wave movements resulting from dilation of the crust of the Earth and movements resulting from at least one other event. The step of discriminating includes the step of filtering out wave movements having a frequency below a first predetermined frequency, e.g., about 180 Hertz. The method also includes the steps of determining a time at which the wave movements are detected by at least one of the first plurality of seismometers, converting the first voltage into digital data, and transmitting the digital data and the time from the at least one first digitizer to a communications interface module. Moreover, the method includes the steps of transmitting the digital data and the time from the communications interface module to a data processor, and determining a likelihood of at least one future earthquake based on a number of the wave movements detected over a predetermined period of time.

30 Claims, 2 Drawing Sheets

U.S. PATENT DOCUMENTS

| | | | | |
|---|---|---|---|---|
| 4,516,206 | A | * | 5/1985 | McEvilly .................... 702/18 |
| 4,616,320 | A | | 10/1986 | Kerr et al. |
| 4,885,724 | A | | 12/1989 | Read et al. |
| 5,412,623 | A | | 5/1995 | Asada et al. |
| 5,420,380 | A | | 5/1995 | Harben et al. |
| 5,625,348 | A | | 4/1997 | Farnsworth et al. |
| 6,308,135 | B1 | * | 10/2001 | Hocking ........................ 702/2 |
| 6,885,918 | B2 | * | 4/2005 | Harmon et al. ............... 701/14 |
| 2002/0103603 | A1 | | 8/2002 | Kawashima |

OTHER PUBLICATIONS

A Mobile Array For Digital Recording And Interpretation of Local Earthquakes—A Prerequisite For The Prediction of Strong Aftershocks, M. Steinwachs, Proc. of the 7th European Conf. on Earthquake Engineering, 1982, pp. 179-187.

Automatic Hypocenter Determination of Volcano Induced Seismic Transients Based on Wavefield Coherence—An Application To The 1998 Eruption of Mt. Merapi, Indonesia, J. Wasserman, vol. 110, 2001, pp. 57-77.

William J. Broad, Listening For Atom Blasts, But Hearing Earthquakes, N.Y Times, published Jan. 18, 2005 at http://query.nytimes.com.

Publication: The AQUINAS System, Science Horizons, Inc., dated Mar. 2004, Part No. IR 04-0002, Version 1.0.

* cited by examiner

SYSTEMS FOR PREDICTING EARTHQUAKES AND METHODS OF EMPLOYING SUCH SYSTEMS

This application is a continuation-in-part of U.S. patent application Ser. No. 10/119,196, filed Apr. 10, 2002 U.S. Pat. No. 6,870,482, which is incorporated herein by reference.

BACKGROUND OF THE INVENTION

1. Field of the Invention

The invention relates generally to systems for predicting earthquakes and methods of employing such earthquake prediction systems. In particular, the invention is directed towards earthquake prediction systems which detect wave movements resulting from dilation of the crust of the Earth, and methods of employing such earthquake prediction systems.

2. Description of Related Art

Earthquakes may cause significant property damage, personal injury, and in some instances, even death. Generally, geologists and seismologists have been unable to predict the approximate location or the approximate magnitude of such earthquakes with sufficient accuracy. Geologists and seismologists also have been unable to predict the approximate time at which such earthquakes may occur with sufficient accuracy. As such, earthquakes generally are unexpected events. Although tremors may last for a few minutes, the majority of property damage and personal injury may occur within the first ten to twenty seconds following arrival of the first tremor of the earthquake. Consequently, various earthquake detection systems have been developed, such that people may recognize when an earthquake is occurring and may move to a safer location when appropriate. Nevertheless, although such earthquake detection systems may detect earthquakes, such systems are not designed to predict earthquakes.

Some known earthquake prediction systems may detect gravitational field turbulence or low frequency radio signals in communication with future earthquakes. However, these earthquake prediction systems only may detect such gravitational field turbulence or low frequency radio signals about twenty seconds prior to an arrival of the first tremor of the earthquake.

SUMMARY OF THE INVENTION

Therefore, a need has arisen for earthquake prediction systems and methods of employing such earthquake prediction systems that overcome these and other shortcomings of the related art. A technical advantage of the present invention is that wave movements resulting from dilation of the crust of the Earth, which occurs prior to an earthquake, may be detected. When wave movements resulting from dilation of the crust of the Earth are detected, the system may determine the velocity of the waves, the amplitude of the waves, and the direction of wave movements. Based on the number of wave movements, i.e., the frequency of wave movements, detected over a predetermined period of time, the system may be used to determine the likelihood of a future earthquake. For example, the system may used to determine that an earthquake is likely to occur between about eight hours and about twenty-four hours prior to an arrival of a first tremor of the earthquake. Moreover, based on the velocity and the amplitude of the waves, the system may be used to determine the approximate magnitude of the future earthquake. Similarly, based on the direction of wave movements, the system also may be used to determine the approximate location of the future earthquake.

According to an embodiment of the present invention, a method of predicting earthquakes is described. The method comprises the step of positioning a first transducer array adjacent to a seismically active region and at least about 3 meters below the surface of the crust of the Earth. The first transducer array comprises a first plurality of seismometers, at least one first clock, and at least one first digitizer. The at least one first clock is in communication with at least one of the first plurality of seismometers, and the at least one first digitizer also is in communication with at least one of the first plurality of seismometers. The method also comprises the steps of detecting a plurality of wave movements resulting from dilation of the crust of the Earth prior to an earthquake, and converting at least one of the wave movements into a first voltage. The method further comprises the step of discriminating between wave movements resulting from dilation of the crust of the Earth and movements resulting from at least one other event. The step of discriminating comprises the step of filtering out wave movements having a frequency below a first predetermined frequency, e.g., about 180 Hertz. The method also comprises the steps of determining a time at which the wave movements are detected by at least one of the first plurality of seismometers, converting the first voltage into digital data, and transmitting the digital data and the time from the at least one first digitizer to a communications interface module. Moreover, the method comprises the steps of transmitting the digital data and the time from the communications interface module to a data processor, and determining a likelihood of at least one future earthquake based on a number of the wave movements detected over a predetermined period of time.

According to another embodiment of the present invention, a system for predicting earthquakes is described. The system comprises a first transducer array. The first transducer array comprises a first plurality of seismometers adapted to detect a plurality of wave movements resulting from dilation of the crust of the Earth prior to an earthquake and to convert at least one of the wave movements into a first voltage. The system also comprises at least one first clock. The at least one first clock is in communication with at least one of the first plurality of seismometers and is adapted to determine a time at which at least one of the first plurality of seismometers detects the wave movements. The system further comprises at least one first digitizer. The at least one first digitizer is in communication with at least one of the first plurality of seismometers and is adapted to convert the first voltage into digital data. The at least one first digitizer comprises a first data transmitter. The system also comprises a communications interface module and a data processor, and the first data transmitter transmits the digital data and the time to the communications interface module, and the communications module transmits the digital data and the time to the data processor. Moreover, the data processor is adapted to determine at least one characteristic of at least one of the waves, and the first transducer array is positioned adjacent to a seismically active region and at least about 3 meters below the surface of the crust of the Earth.

According to still another embodiment of the present invention, a method of predicting earthquakes is described. The method comprises the step of positioning a first transducer array adjacent to a seismically active region and below the water table, i.e., within the zone of saturation below the surface of the crust of the Earth. The water table is the planar surface between the zone of saturation and the zone of aeration. *McGraw-Hill Dictionary of Scientific and Technical Terms,* 2049 (4th ed. 1989). The zone of saturation is a subsurface zone in which water fills the interstices and is under greater than atmospheric pressure. Id. at 2086. The first transducer array comprises a first plurality of seismometers, at least one first clock, and at least one first digitizer. The at least one first clock is in communication with at least one of the first plurality of seismometers, and the at least one first digitizer also is in communication with at least one of the first plurality of seismometers. The method also comprises the steps of detecting a plurality of wave movements resulting from dilation of the crust of the Earth prior to an earthquake, and converting at least one of the wave movements into a first voltage. The method further comprises the step of discriminating between wave movements resulting from dilation of the crust of the Earth and movements resulting from at least one other event. The step of discriminating comprises the step of filtering out wave movements having a frequency below a first predetermined frequency, e.g., about 180 Hertz. The method also comprises the steps of determining a time at which the wave movements are detected by at least one of the first plurality of seismometers, converting the first voltage into digital data, and transmitting the digital data and the time from the at least one first digitizer to a communications interface module. Moreover, the method comprises the steps of transmitting the digital data and the time from the communications interface module to a data processor, and determining a likelihood of at least one future earthquake based on a number of the wave movements detected over a predetermined period of time.

According to yet another embodiment of the present invention, a system for predicting earthquakes is described. The system comprises a first transducer array. The first transducer array comprises a first plurality of seismometers adapted to detect a plurality of wave movements resulting from dilation of the crust of the Earth prior to an earthquake and to convert at least one of the wave movements into a first voltage. The system also comprises at least one first clock. The at least one first clock is in communication with at least one of the first plurality of seismometers and is adapted to determine a time at which at least one of the first plurality of seismometers detects the wave movements. The system further comprises at least one first digitizer. The at least one first digitizer is in communication with at least one of the first plurality of seismometers and is adapted to convert the first voltage into digital data. The at least one first digitizer comprises a first data transmitter. The system also comprises a communications interface module and a data processor, and the first data transmitter transmits the digital data and the time to the communications interface module, and the communications module transmits the digital data and the time to the data processor. Moreover, the data processor is adapted to determine at least one characteristic of at least one of the waves, and the first transducer array is positioned adjacent to a seismically active region and below the water table.

Other objects, features, and advantages of the present invention will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

DETAILED DESCRIPTION OF PREFERRED EMBODIMENTS

Figure 1:
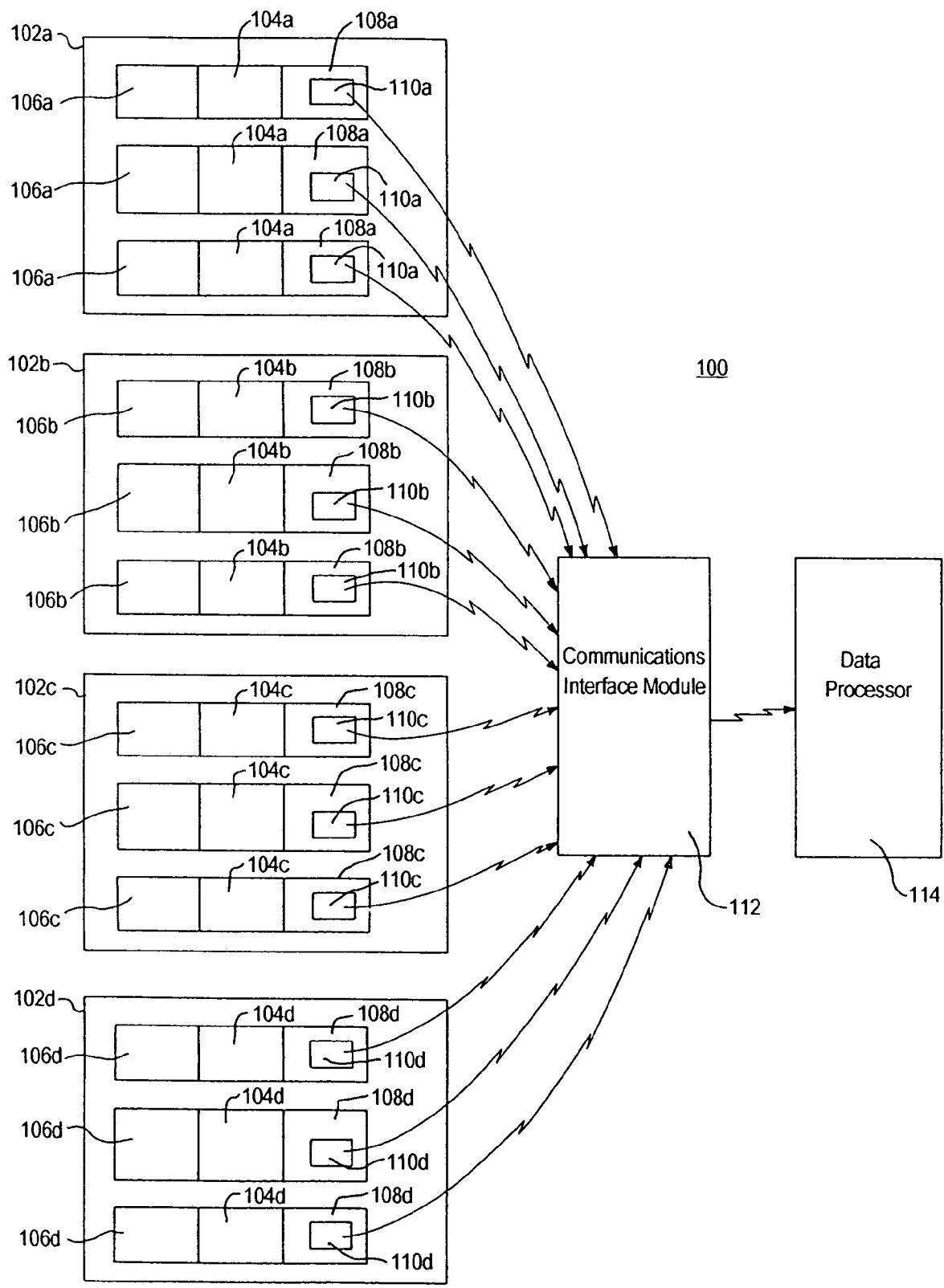
FIG. 1 is a schematic of a system for predicting earthquakes according to an embodiment of the present invention.
Figure 2:
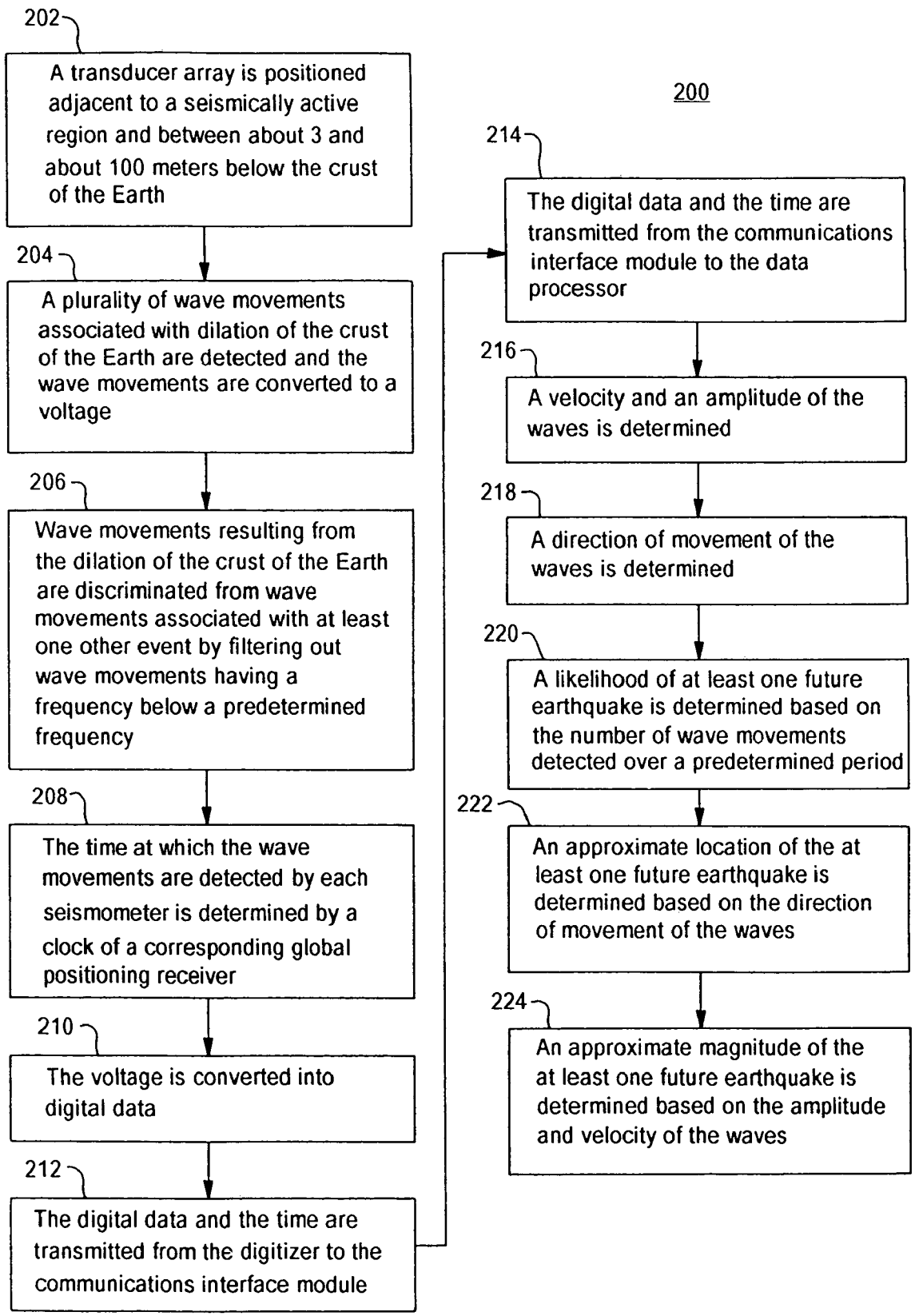
FIG. 2 is a flow-chart of a method for predicting earthquakes according to another embodiment of the present invention.

Preferred embodiments of the present invention and their advantages may be understood by referring to FIGS. 1 and 2, like numerals being used for like corresponding parts in the various drawings.

Referring to FIG. 1, a system 100 for predicting earthquakes may comprise at least one transducer array 102, e.g., between one and about twenty transducer arrays 102. For example, system 100 may comprise a first transducer array 102*a*, a second transducer array 102*b*, a third transducer array 102*c*, a fourth transducer array 102*d*, and combinations thereof. Each transducer array 102 may comprise a plurality of seismometers 104, e.g., between 2 and about 10 seismometers 104, positioned at various locations within transducer array 102. For example, first transducer array 102*a* may comprise a first plurality of seismometers 104*a*, and second transducer array 102*b* may comprise a second plurality of seismometers 104*b*. Similarly, third transducer array 102*c* may comprise a third plurality of seismometers 104*c*, and fourth transducer array 102*d* may comprise a fourth plurality of seismometers 104*d*. Seismometers 104 may be adapted to detect wave movements resulting from dilation, i.e., expansion, of the crust of the Earth, which occurs prior to an earthquake, and to convert the wave movements into a voltage. The crust of the Earth may include those portions of the Earth's interior comprising at least calcium and sodium aluminum-silicate materials, e.g., those portions of the Earth's interior which are up to about 40 kilometers below the surface of the Earth.

Seismometers 104 may be multi-axis seismometers, e.g., three-axis seismometers adapted to detect wave movements in a x-direction, a y-direction, and a z-direction, or single-axis seismometers. Seismometers 104 also may be adapted to discriminate between wave movements resulting from dilation of the crust of the Earth, and wave movements resulting from other events. For example, wave movements resulting from dilation of the crust of the Earth may have frequencies between about 180 and about 360 Hertz, and seismometers 104 may comprise a filter (not shown) adapted to filter out wave movements having frequencies less than a first predetermined frequency, e.g., less than about 180 Hertz, or greater than a second predetermined frequency, e.g., greater than about 360 Hertz, or both. In this embodiment, the filter of each seismometer 104 may not filter out wave movements resulting from dilation of the crust of the Earth, but may filter our wave movements having frequencies below the first predetermined frequency or above the second predetermined frequency, or both. Consequently, the filter of each seismometer 104 may filter out wave movements resulting from a detonation of an explosive device, e.g., a detonation of a nuclear device, which may cause wave movements having frequencies between about 20 Hertz and about 60 Hertz.

Each transducer array 102 also may comprise at least one, e.g., a plurality of, global positioning receivers 106, such as at least one global positioning satellite receiver, and each global positioning receiver 106 may be in communication with at least one of seismometers 104. For example, first transducer array 102a may comprise at least one, e.g., a plurality of, first global positioning receivers 106a, each of which are in communication with at least one of the first plurality of seismometers 104a, and second transducer array 102b may comprise at least one, e.g., a plurality of, second global positioning receivers 106b, each of which are in communication with at least one of the second plurality of seismometers 104b. Similarly, third transducer array 102c may comprise at least one, e.g., a plurality of, third global positioning receivers 106c, each of which are in communication with at least one of the third plurality of seismometers 104c, and fourth transducer array 102d may comprise at least one, e.g., a plurality of, fourth global positioning receivers 106d, each of which are in communication with at least one of the fourth plurality of seismometers 104d. Each global positioning receiver 106 may comprise a clock (not shown) adapted to determine a time, e.g., 9:00 a.m. EST, at which seismometer 104 in communication with global positioning receiver 106 detects wave movements resulting from dilation of the crust of the Earth. For example, when at least one of the first plurality of seismometers 104a detects wave movements resulting from dilation of the crust of the Earth, the clock of the at least one global positioning receiver 106a may determine the time at which such detection occurred. Similarly, when at least one of the second plurality of seismometers 104b detects wave movements resulting from dilation of the crust of the Earth, the clock of the at least one second global positioning receiver 106b may determine the time at which such detection occurred.

Each global positioning receiver 106 also may be adapted to determine a location of their associated seismometer 104. For example, when each transducer array 102 comprises a plurality of global positioning receivers 106, each first global positioning receiver 106a may be adapted to determine when their associated seismometer 104a detects wave movements resulting from dilation of the crust of the Earth. As such, when data is transmitted from first transducer array 102a, system 100 will be able to determine that such data originated from a particular seismometer 104a of first transducer array 102a. Similarly, each second global positioning receiver 106b may be adapted to determine when their associated seismometer 104b detects wave movements resulting from dilation of the crust of the Earth. As such, when data is transmitted from second transducer array 102b, system 100 will be able to determine that such data originated from a particular seismometer 104b of second transducer array 102b.

Each transducer array 102 also may comprise at least one, e.g., a plurality of, digitizers 108, and each digitizer 108 may be in communication with at least one of seismometers 104. For example, first transducer array 102a may comprise at least one, e.g., a plurality of, first digitizers 108a, each of which are in communication with at least one of the first plurality of seismometers 104a, and second transducer array 102b may comprise at least one, e.g., a plurality of, second digitizers 108b, each of which are in communication with at least one of the second plurality of seismometers 104b. Similarly, third transducer array 102c may comprise at least one, e.g., a plurality of, third digitizers 108c, each of which are in communication with at least one of the third plurality of seismometers 104c, and fourth transducer array 102d may comprise at least one, e.g., a plurality of, fourth digitizers 108d, each of which are in communication with at least one of the fourth plurality of seismometers 104d. Each digitizer 108 may be adapted to convert voltage into digital data, and also may comprise a data transmitter 110, e.g., data transmitters 110a–110d. System 100 also may comprise a communications interface module 112 and a data processor 114.

In operation, at least one of digitizers 108 may convert voltage into digital data. Moreover, data transmitter 110 of digitizer 108 may transmit the digital data, the time at which seismometer 104 detected the wave movement, the location of seismometer 104, and combinations thereof to communications interface module 112. Data transmitter 110 may transmit the digital data, the time, the location, and combinations thereof by any known transmission method, e.g., via a wireless system, such as a radio modem, a hardwired system, or the like. For example, when a radio modem is employed, each data transmitter 110 may transmit data at a different radio frequency than each of the other data transmitters 110, or may transmit data at the same radio frequency as at least one other data transmitter 110. When data transmitter 110 transmits data at the same radio frequency as at least one other data transmitter 110, communications interface module 112 may be adapted to prevent those data transmitters 110 transmitting data at the same radio frequency from simultaneously transmitting data to communications interface module 112.

Communications interface module 112 further may transmit the digital data, the time, the location, and combinations thereof to data processor 114. Communications interface module 112 may transmit the digital data, the time, the location, and combinations thereof by any known transmission method, e.g., via a wireless system, a hardwired system, or the like. For example, communications interface module 112 may convert the data which it received from each digitizer 108 into a single stream of data, and may transmit the single stream of data to data processor 114. Further, data processor 114 may be adapted to determine a velocity of the waves resulting from dilation of the crust of the Earth. Data processor 114 also may be adapted to determine an amplitude of the waves resulting from dilation of the crust of the Earth. Moreover, data processor 114 may be adapted to determine a direction of movement of the waves resulting from dilation of the crust of the Earth. For example, data processor 114 may comprise software adapted to determine the velocity of the waves, the amplitude of the waves, and the direction of wave movement.

In operation, each of the first plurality of seismometers 104a of first transducer array 102a may be positioned adjacent to a seismically active region, and also may be positioned a predetermined distance below the surface of the crust of the Earth. For example, each of the first plurality of seismometers 104a may be positioned between about 3 meters and about 100 meters below the crust of the Earth or below the water table, i.e., within the zone of saturation; or both. Nevertheless, it will be understood by those of ordinary skill in the art that the predetermined distance below the surface of the crust of the Earth may be any distance sufficient to prevent seismometers 104 from detecting disturbances occurring on or above the surface of the crust of the Earth, e.g., rain, animal movement, or the like, and to allow seismometers 104 to detect wave movements resulting from dilation of the crust of the Earth. Moreover, each of the first plurality of seismometers 104a may be separated from each other by a predetermined separation distance, e.g., between about 15 meters and about 1500 meters. Similarly, each of the second plurality of seismometers 104b of second transducer array 102b may be positioned adjacent to the seismically active region, and also may be positioned the predetermined distance below the surface of the crust of the Earth. Second transducer array 102b may be positioned between about 30 kilometers and about 70 kilometers from first transducer array 102a. In another embodiment, each of the third plurality of seismometers 104c of third transducer array 102c may be positioned adjacent to the seismically active region, and also may be positioned the predetermined distance below the surface of the crust of the Earth. Third transducer array 102c may be positioned between about 30 kilometers and about 70 kilometers from second transducer array 102b.

In one embodiment, when at least one of seismometers 104 detect wave movements resulting from dilation of the crust of the Earth, each seismometer 104 detecting the wave movements may convert the wave movements into a voltage. Further, each digitizer 108 in communication with at least one of seismometers 104 detecting the wave movements may convert the voltage into digital data, and each clock in communication with at least one of seismometers 104 detecting the wave movements may determine the time or the times at which the wave movements were detected by seismometer 104. Moreover, each global positioning receiver 106 may determine whether their associated seismometer 104 detected wave movements. Subsequently, each transmitter 110 of each digitizer 108 in communication with at least one of seismometers 104 detecting the wave movements may transmit the digital data, the time at which the associated seismometer 104 detected the wave movements, and the location of the associated seismometer 104 to communications interface module 112. Communications interface module 112 may convert the data which it received from digitizers 108 into a single stream of data, and also may transmit the single stream of data to data processor 114. Data processor 114 may determine the velocity of the waves detected by each plurality of seismometers 104, the amplitude of the waves detected by each plurality of seismometers 104, and the direction of wave movement.

Based on the number of wave movements, i.e., the frequency of wave movements, detected over a predetermined period of time, the likelihood of at least one future earthquake may be determined. Specifically, as the frequency of the wave movements over the predetermined period of time increases, the likelihood of at least one future earthquake also may increase. For example, when the frequency of the wave movements over the predetermined period of time is greater than a predetermined frequency of wave movements over the predetermined period of time, it may be more likely than not, i.e., greater than 50%, that an earthquake will occur between about 8 hours and about 24 hours from when the frequency of the wave movements over the predetermined period of time surpassed the predetermined frequency of wave movements over the predetermined period of time. Further, based on the direction of wave movements, the approximate location of the future earthquake may be determined, and based on the amplitude and the velocity of the waves, the approximate magnitude of the future earthquake may be determined.

Referring to FIG. 2, a method 200 of predicting earthquakes is described. In step 202, at least one transducer array 102 may be positioned adjacent to a seismically active region and between about 3 meters and about 100 meters below the crust of the Earth or below the water table, i.e., within the zone of saturation; or both. When a plurality of transducer arrays 102 are employed, each transducer array 102 may be between about 30 kilometers and about 70 kilometers from another transducer array 102. In step 204, a plurality of wave movements resulting from dilation of the crust of the Earth are detected, and the wave movements are converted to voltages. In step 206, wave movements resulting from dilation of the crust of the Earth may be discriminated from wave movements resulting from at least one other event by filtering out those wave movements having frequencies which are less than a first predetermined frequency, e.g., less than about 180 Hertz, or greater than a second predetermined frequency, e.g., greater than about 360 Hertz, or both. In step 208, a time at which the wave movements are detected by at least one seismometer 104 may be determined. In one embodiment, in step 208, the location of seismometer 104 which detected wave movements resulting from dilation of the crust of the Earth also may be determined. In step 210, the voltage may be converted into digital data, and in step 212, the digital data, the time, the location, and combinations thereof may be transmitted from a transmitter 110 of a digitizer 108 to a communications interface module 112.

In step 214, the digital data, the time, the location, and combinations thereof may be transmitted from communications interface module 112 to a data processor 114. In step 216, a velocity and an amplitude of the waves may be determined, and in step 218, a direction of movement of the waves may be determined. In step 220, a likelihood of at least one future earthquake may be determined based on the number of wave movements detected over a predetermined period of time. In one embodiment, the method also may comprise steps 222 and 224. In this embodiment, in step 222, an approximate location of the at least one earthquake may be determined based on the direction of movement of the waves. Moreover, in step 224, an approximate magnitude of the at least one earthquake may be determined based on the amplitude and velocity of the waves. In another embodiment, subsequent to determining the likelihood of at least one earthquake, the location of the at least one earthquake, the magnitude of the at least one earthquake, and combinations thereof, an appropriate entity or person, e.g., an appropriate government agency or government official, may be contacted in order to advise that entity or person of the at least one earthquake.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are considered as exemplary of the invention indicated by the flowing claims.

What is claimed is:

1. A system for predicting earthquakes comprising:
   a first transducer array comprising:
      a first plurality of seismometers adapted to detect a plurality of wave movements resulting from dilation of the crust of the Earth prior to an earthquake, wherein said first plurality of seismometers detect said wave movements and convert at least one of said wave movements into a first voltage;
      at least one first clock, wherein said at least one first clock is in communication with at least one of said first plurality of seismometers and is adapted to determine a time at which at least one of said first plurality of seismometers detects said wave movements; and
      at least one first digitizer, wherein said at least one first digitizer is in communication with at least one of said first plurality of seismometers and is adapted to convert said first voltage into digital data, wherein said at least one first digitizer comprises a first data transmitter;

a communications interface module; and a data processor, wherein said first data transmitter transmits said digital data and said time to said communications interface module, and said communications module transmits said digital data and said time to said data processor, wherein said data processor is adapted to determine at least one characteristic of at least one of said waves, and said first transducer array is positioned adjacent to a seismically active region and below the water table.

2. The system of claim 1, wherein said at least one characteristic comprises a direction of at least one of said wave movements.

3. The system of claim 1, wherein said at least one characteristic comprises a velocity of at least one of said waves and an amplitude of at least one of said waves.

4. The system of claim 3, wherein said at least one characteristic comprises a direction of at least one of said wave movements.

5. The system of claim 1, wherein said first transducer array further comprises at least one first global positioning receiver, wherein said at least one global positioning receiver is in communication with at least one of said first plurality of seismometers and comprises said at least one first clock, wherein said at least one first global positioning receiver is adapted to determine a location of at least one of said first plurality of seismometers and said first data transmitter transmits said digital data, said time, and said location to said communications interface module, wherein said communications module transmits said digital data, said time, and said location to said data processor.

6. The system of claim 5, wherein said system further comprises a second transducer array, wherein said second transducer array comprises:

a second plurality of seismometers adapted to detect a plurality of wave movements resulting from dilation of the crust of the Earth prior to an earthquake, wherein said second plurality of seismometers detect said wave movements and convert at least one of said wave movements into a second voltage;

at least one second global positioning receiver, wherein said at least one second global positioning receiver is in communication with at least one of said second plurality of seismometers and is adapted to determine a location of at least one of said second plurality of seismometers, wherein said at least one second global positioning receiver comprises a second clock adapted to determine a time at which at least one of said second plurality of seismometers detects said wave movements; and at least one second digitizer, wherein said at least one second digitizer is in communication with at least one of said second plurality of seismometers and is adapted to convert said second voltage into digital data, wherein said at least one second digitizer comprises a second data transmitter and said second data transmitter transmits said digital data, said time, and said location to said communications interface module, wherein said communications module transmits said digital data, said time, and said location to said data processor, and said second transducer array is positioned adjacent to said seismically active region and below the water table.

7. The system of claim 6, wherein said first transducer array is positioned between about 30 kilometers and about 70 kilometers from said second transducer array.

8. The system of claim 7, wherein at least one of said first plurality of seismometers is positioned between about 15 meters about 1500 meters from another of said first plurality of seismometers, and at least one of said second plurality of seismometers is positioned between about 15 meters and about 1500 meters from another of said second plurality of seismometers.

9. The system of claim 7, wherein each of said first plurality of seismometers are multi-axis seismometers and each of said second plurality of seismometers are multi-axis seismometers.

10. The system of claim 5, wherein a number of said at least one first digitizers; said at least one first clocks; and said at least one first global positioning receivers employed in said system is the same as a number of said first plurality of seismometers employed in said system.

11. The system of claim 5, wherein said at least one first global positioning receiver comprises a global positioning satellite receiver.

12. The system of claim 1, wherein each of said first plurality of seismometers are multi-axis seismometers.

13. The system of claim 1, wherein said first transducer array is positioned below the water table and less than about 100 meters below the surface of the crust of the Earth.

14. The system of claim 1, wherein each of said plurality of seismometers comprises a filter adapted to discriminate between said wave movements resulting from dilation of the crust of the Earth and movements resulting from at least one other event.

15. The system of claim 1, wherein a number of said at least one first digitizers employed in said system is the same as a number of said first plurality of seismometers employed in said system.

16. The system of claim 15, wherein a number of said at least one first clocks employed in said system is the same as said number of said first plurality of seismometers employed in said system.

17. A method of predicting earthquakes comprising the steps of:

positioning a first transducer array adjacent to a seismically active region and below the water table, wherein said first transducer array comprises:

a first plurality of seismometers;

at least one first clock, wherein said at least one first clock is in communication with at least one of said first plurality of seismometers; and at least one first digitizer, wherein said at least one first digitizer is in communication with at least one of said first plurality of seismometers;

detecting a plurality of wave movements resulting from dilation of the crust of the Earth prior to an earthquake and converting at least one of said wave movements into a first voltage;

discriminating between said wave movements resulting from dilation of the crust of the Earth and movements resulting from at least one other event, wherein the step of discriminating comprises the step of filtering out wave movements having a frequency below a first predetermined frequency;

determining a time at which said wave movements are detected by at least one of said first plurality of seismometers;

converting said first voltage into digital data;

transmitting said digital data and said time from said at least one first digitizer to a communications interface module;

transmitting said digital data and said time from said communications interface module to a data processor; and determining a likelihood of at least one future earthquake based on a number of said wave movements detected over a predetermined period of time.

18. The method of claim 17, further comprising the steps of:

determining a velocity and an amplitude of said waves; and determining an approximate magnitude of said at least one future earthquake based on said velocity and said amplitude of said waves.

19. The method of claim 17, further comprising the steps of:

determining a direction of said wave movements; and determining an approximate location of said at least one future earthquake based on said direction of said wave movements.

20. The method of claim 19, further comprising the steps of:

determining a velocity and an amplitude of said waves; and determining an approximate magnitude of said at least one future earthquake based on said velocity and said amplitude of said waves.

21. The method of claim 17, wherein said first transducer array further comprises at least one first global positioning receiver in communication with at least one of said first plurality of seismometers, wherein said at least one first global positioning receiver comprises said at least one first clock, and said method further comprises the steps of:

determining a location of at least one of said first plurality of seismometers which detected said wave movements;

transmitting said digital data, said time, and said location to said communications interface module; and transmitting said digital data, said time, and said location to said data processor.

22. The method of claim 21, further comprising the steps of:

positioning a second transducer array adjacent to said seismically active region and below the water table, wherein said second transducer array comprises:

a second plurality of seismometers;

at least one second global positioning receiver, wherein said at least one second global positioning receiver is in communication with at least one of said second plurality of seismometers and comprises a second clock; and at least one second digitizer, wherein said at least one second digitizer is in communication with at least one of said second plurality of seismometers;

detecting a plurality of wave movements resulting from dilation of the crust of the Earth prior to an earthquake and converting said wave movements into a second voltage;

determining a time at which said wave movements are detected by at least one of said second plurality of seismometers;

determining a location of at least one of said second plurality of seismometers which detected said wave movements;

converting said second voltage into digital data; and transmitting said digital data, said time, and said location from said at least one second digitizer to said communications interface module.

23. The method of claim 22, wherein said first transducer array is positioned between about 30 kilometers and about 70 kilometers from said second transducer array.

24. The method of claim 23, wherein at least one of said first plurality of seismometers is positioned between about 15 meters and about 1500 meters from another of said first plurality of seismometers, and at least one of said second plurality of seismometers is positioned between about 15 meters and about 1500 meters from another of said second plurality of seismometers.

25. The method of claim 22, wherein each of said first plurality of seismometers are multi-axis seismometers and each of said second plurality of seismometers are multi-axis seismometers.

26. The method of claim 17, wherein each of said first plurality of seismometers are multi-axis seismometers.

27. The method of claim 17, further comprising the step of advising at least one government official of the at least one future earthquake.

28. The method of claim 17, wherein said first transducer array is positioned below the water table and less than about 100 meters below the surface of the crust of the Earth.

29. The method of claim 17, wherein the step of discriminating further comprises the step of filtering out wave movements having a frequency above a second predetermined frequency.

30. The method of claim 29, wherein said first predetermined frequency is about 180 Hertz and said second predetermined frequency is about 360 Hertz.

* * * * *